(12) United States Patent
Kuwahara

(10) Patent No.: US 6,392,324 B1
(45) Date of Patent: May 21, 2002

(54) ROTOR OF ROTATING MACHINE AND METHOD FOR PRODUCING SAME

(75) Inventor: Tohru Kuwahara, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/705,787

(22) Filed: Nov. 6, 2000

(30) Foreign Application Priority Data

Aug. 11, 1999 (JP) ............................................ 11-317128
Oct. 4, 2000 (JP) ........................................ 2000-305429

(51) Int. Cl.⁷ .......................... H02K 21/12; H02K 1/22
(52) U.S. Cl. .................. 310/156.11; 310/261; 310/268
(58) Field of Search .............................. 310/156, 261, 310/268

(56) References Cited

U.S. PATENT DOCUMENTS

| | | | | |
|---|---|---|---|---|
| 4,117,360 A | * | 9/1978 | Richter | 310/183 |
| 4,504,755 A | | 3/1985 | Semones et al. | 310/156 |
| 4,663,551 A | * | 5/1987 | Weh et al. | 310/152 |
| 5,369,325 A | * | 11/1994 | Nagate et al. | 310/156 |
| 5,378,953 A | * | 1/1995 | Uchida et al. | 310/156 |
| 5,463,262 A | * | 10/1995 | Uchida | 310/156 |
| 5,731,647 A | * | 3/1998 | Schüller et al. | 310/114 |
| 5,844,344 A | * | 12/1998 | Uetake et al. | 310/156 |
| RE36,367 E | * | 11/1999 | Nagate et al. | 310/156 |
| 6,005,318 A | * | 12/1999 | Pop, Sr. | 310/156 |
| 6,121,706 A | * | 9/2000 | Nashiki et al. | 310/168 |
| 6,246,141 B1 | * | 6/2001 | Bailey | 310/211 |

FOREIGN PATENT DOCUMENTS

| | | |
|---|---|---|
| FR | 1150327 | 1/1958 |
| FR | 1313993 | 11/1962 |
| GB | 1503708 | 3/1978 |

* cited by examiner

*Primary Examiner*—Nestor Ramirez
*Assistant Examiner*—Pedro J. Cuevas
(74) *Attorney, Agent, or Firm*—Antonelli, Terry, Stout & Kraus, LLP

(57) ABSTRACT

A rotor of a rotating machine includes a body portion having a rotating shaft mounted therein substantially integrally, having a circular outer peripheral surface and opposite side surfaces, and formed of a nonmagnetic material; and permanent magnets and magnetic members provided integrally with the body portion and arranged radially and circumferentially alternately in intimate contact with each other. Each of the permanent magnets is completely embedded in the body portion, and each of the magnetic members has only a radially outward end surface thereof exposed, and has other surfaces thereof embedded in the body portion The rotor can be produced by die casting.

4 Claims, 13 Drawing Sheets

ROTOR OF ROTATING MACHINE AND METHOD FOR PRODUCING SAME

FIELD OF THE INVENTION

This invention relates to a rotor of a rotating machine which is an electric generator or an electric motor. More specifically, the invention relates to a rotor having shaft means mounted therein integrally, and having a plurality of permanent magnets and a plurality of magnetic members disposed therein; and also relates to a method for producing the rotor.

DESCRIPTION OF THE PRIOR ART

An example of a rotor constituting a rotating machine which is an electric generator or an electric motor includes a rotating shaft, a relatively thick-walled sleeve fitted to and mounted on the rotating shaft, permanent magnets and magnetic members arranged radially and circumferentially alternately on an outer peripheral portion of the sleeve, and a pair of side covers disposed on axially opposite side surfaces of the sleeve, each of the permanent magnets and each of the magnetic members and holding the sleeve, permanent magnets and magnetic members while sandwiching the sleeve, permanent magnets and magnetic members in an axial direction. The sleeve and the pair of side covers are each formed of a nonmagnetic material such as austenitic stainless steel or an aluminum alloy. Each of the magnetic members is composed of a laminate of metal plates comprising a magnetic material, for example, electromagnetic steel sheets.

The sleeve is keyed to the rotating shaft, and thereby coupled thereto integrally. On an outer peripheral surface of the sleeve, there are formed grooves spaced in a circumferential direction and extending in an axial direction. At a radially inward position, corresponding to each of the grooves, in each of the magnetic members comprising the laminate of electromagnetic steel sheets, there is formed a protrusion extending radially inwardly. Each of the magnetic members is disposed such that the magnetic member cannot make relative rotations relative to the sleeve coupled to the rotating shaft, because the protrusion of the magnetic member is fitted into the corresponding groove formed in the outer peripheral surface of the sleeve. Each of the magnetic members has a projection extending radially outwardly of each of the permanent magnets. In each of the projections, a flange portion extending circumferentially bilaterally outwardly is formed. In this condition, consider a state in which each of the magnetic members is disposed on the sleeve, and each of the permanent magnets is inserted into, and held in, a radial space formed in the circumferential direction of each of the magnetic members. In this state, a radially outward end of each of the permanent magnets is held by each of the flange portions opposed with spacing in the circumferential direction so that the permanent magnet will not escape radially outwardly. Between the pair of side covers, a plurality of through bolts are disposed in such a manner as to pass through one of the side covers, each of the magnetic members, and the other side cover. An end portion of each of the through bolts is clamped by a nut. As a result, each of the permanent magnets and magnetic members arranged on the outer peripheral portion of the sleeve coupled to the rotating shaft has the axially opposite side surfaces thereof squeezed between the pair of side covers, together with the sleeve, whereby the permanent magnets, magnetic members, and sleeve are connected together integrally with the rotating shaft. A radially outward end surface of each of the magnetic members is an arcuate surface of substantially the same shape. These radially outward end surfaces are positioned with spacing in the circumferential direction on a circular outer peripheral surface having the same axis center as the rotating shaft (i.e., the spacing formed between the adjacent flange portions opposed in the circumferential direction).

However, the foregoing conventional rotor is composed of many kinds of and a large number of components, such as the rotating shaft, the sleeve, the keys for coupling the rotating shaft and the sleeve, the plurality of permanent magnets, the plurality of magnetic members, the pair of side covers, and the plurality of through bolts and nuts. Besides, these varieties of many components have to be gathered and assembled. Consequently, the number of the components is large, and the man-hours for assembly are many. The assembly work is laborious and the burden on labor is heavy. A relatively long assembly time is required, boosting the manufacturing cost as a whole. In addition, the radially outward end surface of each of the permanent magnets is exposed to the outside from a spacing formed between the circumferentially opposed flange portions of the magnetic member, and thus is not completely sealed. Surface treatment for antioxidation is required at this site. In this respect as well, a cost increase cannot be avoided.

SUMMARY OF THE INVENTION

An object of the present invention is to provide a novel rotor of a rotating machine, whose structure is simple and whose components are small in number; and which can be manufactured at a lower cost than in the earlier technologies.

Another object of the invention is to provide a method for producing a novel rotor of a rotating machine, the method facilitating production, being capable of shortening the manufacturing time, and thus enabling production at a lower cost than in the earlier technologies.

Other objects and characteristics of the invention will become clear from the following description for explaining in detail embodiments of the rotor of a rotating machine constituted according to the invention, and a method for producing the rotor, with reference to the accompanying drawings.

According to an aspect of the invention, there is provided a rotor of a rotating machine, comprising:

a body portion having shaft means mounted therein substantially integrally, having a substantially circular outer peripheral surface and opposite side surfaces, and being formed of a nonmagnetic material; and permanent magnets and magnetic members provided integrally with the body portion, and arranged radially and circumferentially alternately in intimate contact with each other, wherein:

each of the permanent magnets is completely embedded in the body portion; and each of the magnetic members has only a radially outward end surface thereof exposed, and has other surfaces thereof embedded in the body portion.

Preferably, each of the magnetic members has a projection extending radially outwardly of each of the permanent magnets, a space portion is formed in the circumferential direction by the adjacent projections outwardly of a radially outward end surface of each of the permanent magnets, the body portion is disposed so as to fill the space portions, and a gap among radially inward side surfaces of each of the permanent magnets and each of the magnetic members and an outer peripheral surface of the shaft means, and so as to cover axially opposite side surfaces of each of the permanent magnets and each of the magnetic members to a predetermined thickness, and the exposed radially outward end surface of each of the magnetic members is substantially coplanar with the outer peripheral surface of the body portion.

Preferably, overhangs extending in circumferentially mutually approaching directions from circumferentially opposed side surfaces of adjacent magnetic members and being opposed with a circumferential gap therebetween are formed in radially outward edge portions of the adjacent magnetic members.

Also preferably, a segment of the body portion is disposed so as to fill the space portion defined by the radially outward end surface of each of the permanent magnets, side surfaces of the adjacent magnetic members circumferentially opposed to each other radially outwardly of the end surface, and opposed surfaces and radially inward side surfaces of circumferentially opposed overhangs; and the exposed radially outward end surfaces of the magnetic members are partitioned at equal intervals by the segments of the body portion disposed so as to fill the circumferential gaps between the opposed overhangs.

According to another aspect of the invention, there is provided a method for producing a rotor of a rotating machine, comprising:

inserting and holding a non-magnetized permanent magnet in each of slots formed in a magnetic material of a substantially cylindrical shape having a circular outer peripheral surface, the slots being circumferentially spaced from each other and arranged radially, and the slots having one end open radially inwardly and having the other end closed, with an arcuate bridge portion being left between the other end and the outer peripheral surface, each of the non-magnetized permanent magnet being inserted and held in the slot such that a space portion is left between the non-magnetized permanent magnet and the bridge portion;

then setting shaft means in alignment with an axis center of the magnetic material;

then filling a molten nonmagnetic material into a gap among the magnetic material, each of the non-magnetized permanent magnets, and the shaft means, and into each of the space portions, and also covering axially opposite side surfaces of the magnetic material and each of the non-magnetized permanent magnets to a predetermined thickness, thereby forming a body portion, and casting the shaft means, the magnetic material and each of the non-magnetized permanent magnets integrally into the body portion;

cooling the composite;

then cutting an outer peripheral surface of the body portion and the outer peripheral surface of the magnetic material about an axis center of the shaft means to cut off each of the bridge portions, thereby converting the magnetic material into magnetic members circumferentially separated from each other, and making a radially outward end surface of each of the magnetic members form an exposed surface from the body portion, and also positioning the exposed surface to be substantially coplanar with the outer peripheral surface of the body portion; and then magnetizing each of the non-magnetized permanent magnets from the exposed surface of each of the magnetic members.

According to a further aspect of the invention, there is provided a method for producing a rotor of a rotating machine, comprising:

inserting and holding a non-magnetized permanent magnet in each of slots formed in a magnetic material of a substantially cylindrical shape having a circular outer peripheral surface, the slots being circumferentially spaced from each other and arranged radially, and the slots having one end open radially inwardly and having the other end closed, with a bridge portion being left between the other end and the outer peripheral surface, the bridge portion having a notch extending radially outwardly from a radially inward end surface thereof, each of the non-magnetized permanent magnets being inserted and held in the slot such that a space portion is left between the non-magnetized permanent magnet and the bridge portion;

then setting shaft means in alignment with an axis center of the magnetic material;

then filling a molten nonmagnetic material into a gap among the magnetic material, each of the non-magnetized permanent magnets, and the shaft means, and into each of the space portions, and also covering axially opposite side surfaces of the magnetic material and each of the non-magnetized permanent magnets to a predetermined thickness, thereby forming a body portion, and casting the shaft means, the magnetic material and each of the non-magnetized permanent magnets integrally into the body a portion;

cooling the composite;

then cutting an outer peripheral surface of the body portion and the outer peripheral surface of the magnetic material about an axis center of the shaft means so that the bridge portions will be circumferentially separated, with the nonmagnetic material filled into each of the notches as a boundary between the adjacent bridge portions, thereby converting the magnetic material into magnetic members circumferentially separated from each other, and making a radially outward end surface of each of the magnetic members form an exposed surface from the body portion, and also positioning the exposed surface to be substantially coplanar with the outer peripheral surface of the body portion; and then magnetizing each of the non-magnetized permanent magnets from the exposed surface of each of the magnetic members.

DETAILED DESCRIPTION OF THE PREFERRED EMBODIMENTS

Figure 1:
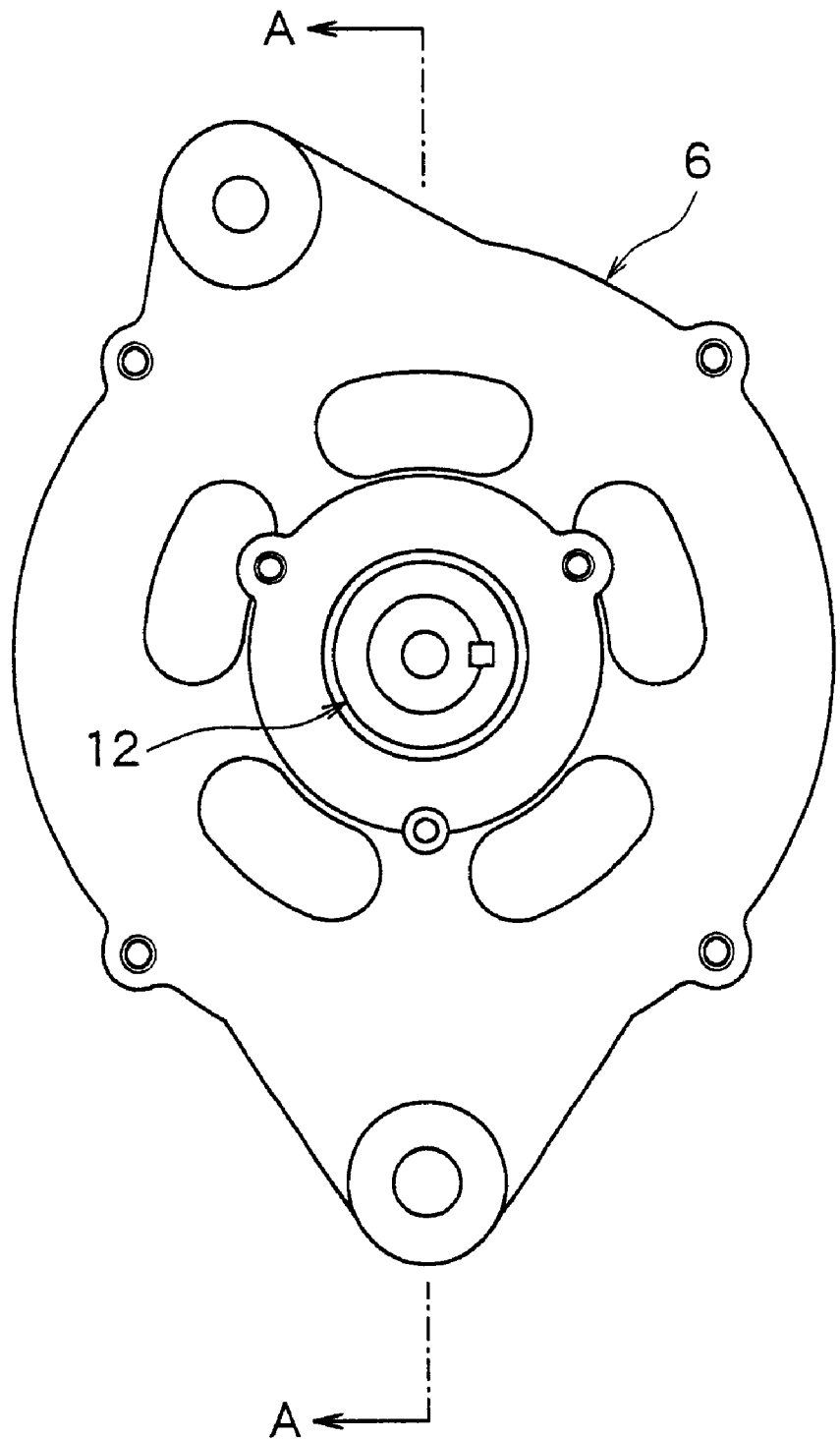
FIG. 1 is a side view of a rotating machine having a rotor in accordance with the present invention.

Preferred embodiments of the present invention will now be described in more detail with reference to the accompanying drawings. In FIGS. 1 to 15, substantially the same portions are shown by the same numerals. A rotating machine entirely indicated at the numeral 2, which is an electric generator, has a rotor 4, a pair of case members 6 and 8, and a stator 10, as shown in FIGS. 1 to 4. The rotor 4 is composed of a rotating shaft 12 integrally mounted via a sleeve 14, a plurality of permanent magnets 16, a plurality of magnetic members 18, and a body portion 20. Each of the permanent magnets 16 is completely embedded in the body portion 20, while each of the magnetic members 18 has only a radially outward end surface thereof exposed, and has other surfaces thereof all embedded in the body portion 20.

Figure 2:
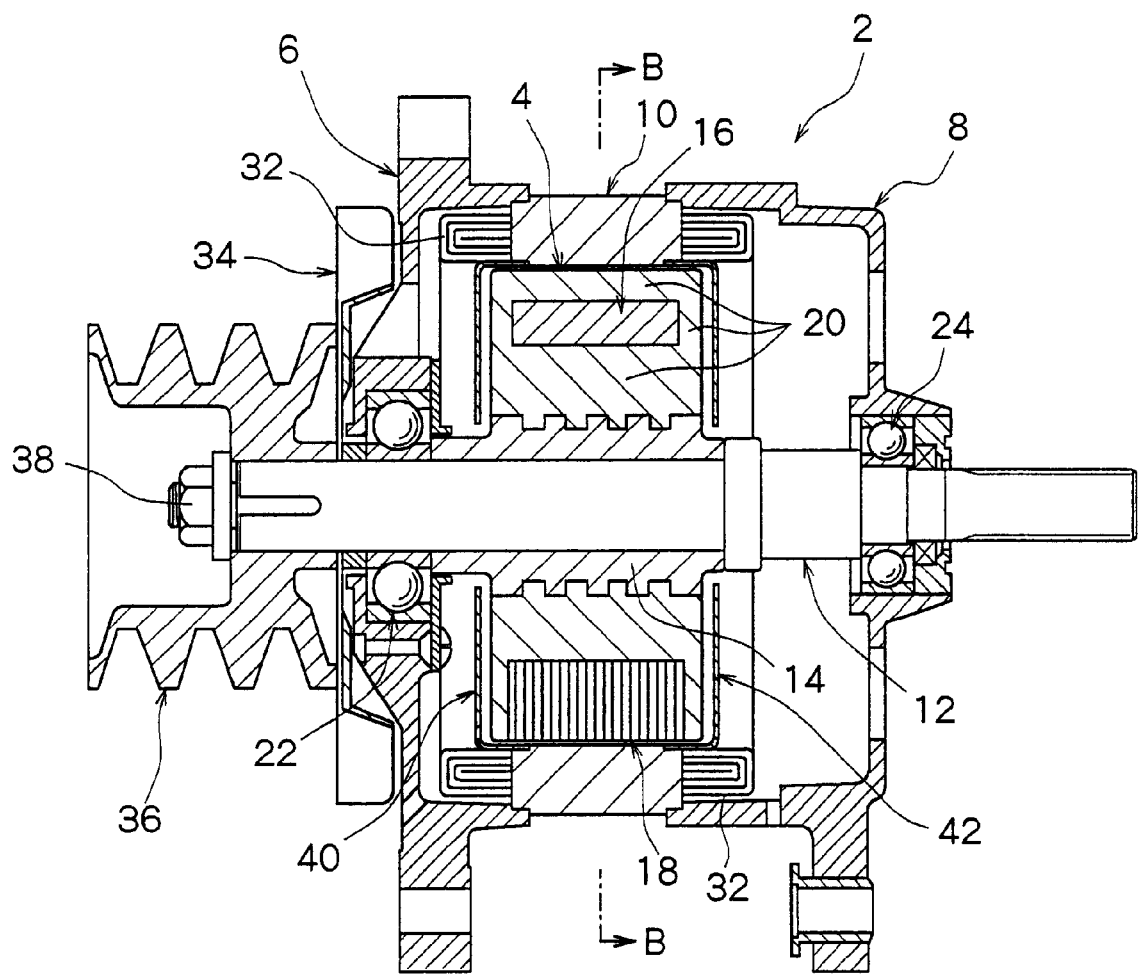
FIG. 2 is a sectional view taken on line A—A of FIG. 1.
Figure 3:
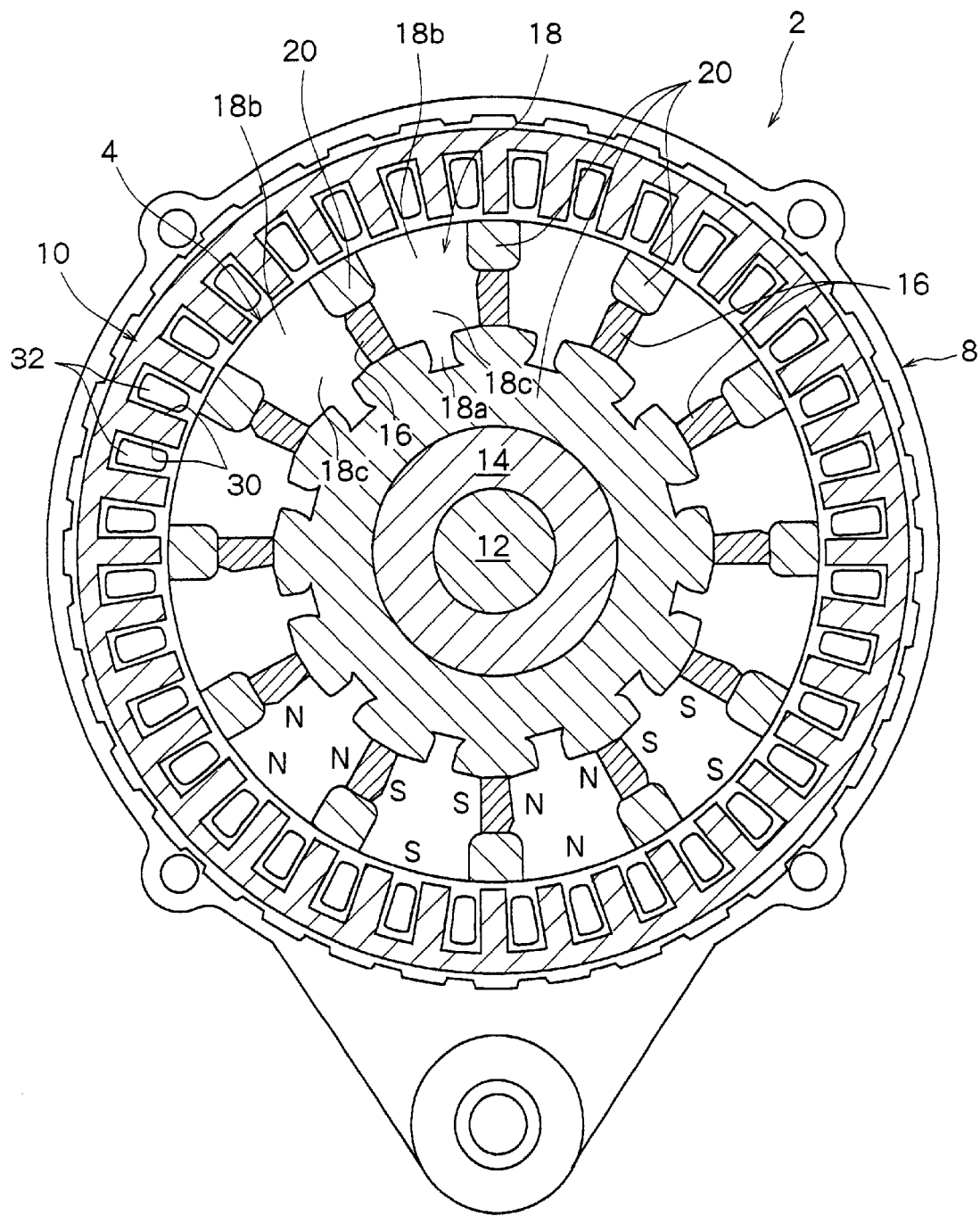
FIG. 3 is an enlarged sectional view taken on line B—B of FIG. 2.
Figure 4:
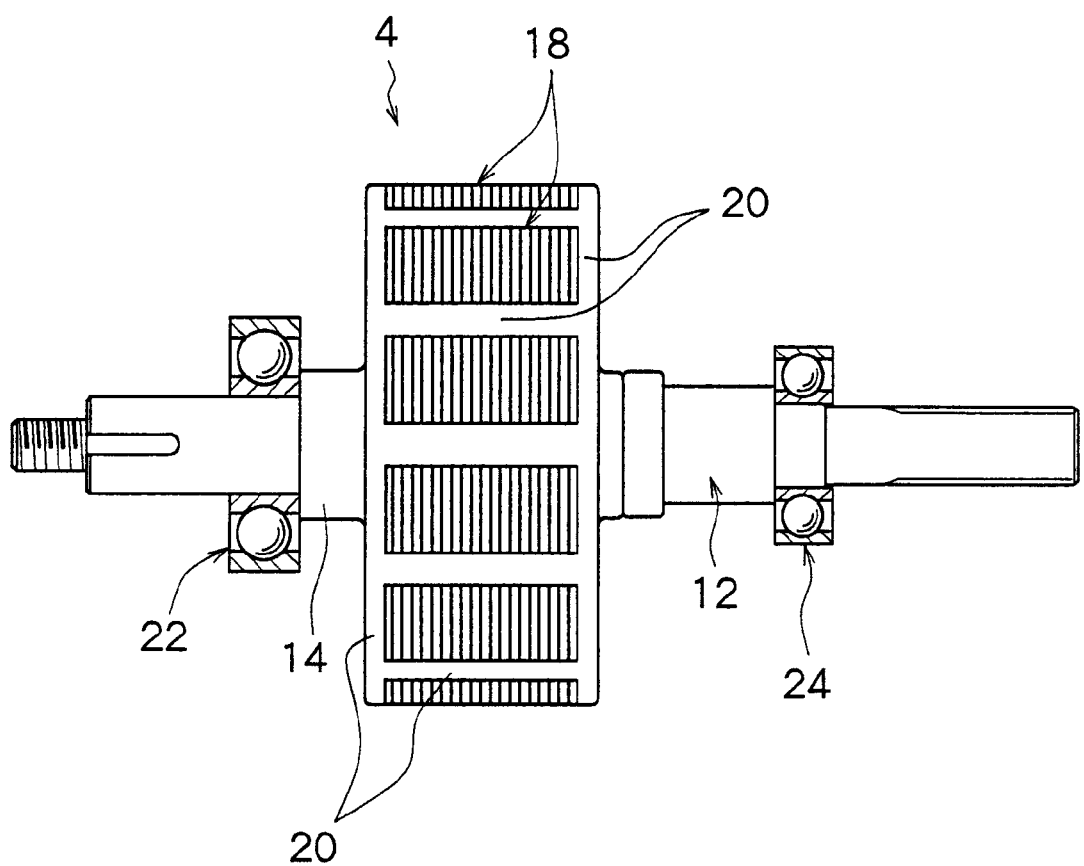
FIG. 4 is a plan view of the rotor having radial ball bearings assembled to a rotating shaft.

The configuration (completed configuration) of the rotor 4 according to the invention will be described more concretely. With reference to FIGS. 2 to 4, the body portion 20 comprises a nonmagnetic material such as an aluminum alloy or a zinc alloy, e.g., an aluminum alloy in the embodiments. As will be described later on, the body portion 20 has the sleeve 14, each of the permanent magnets 16, and each of the magnetic members 18 integrally embedded therein by die casting, and has an outer peripheral surface of a substantially circular shape, and opposite side surfaces extending perpendicularly to an axial direction. To the body portion 20, the sleeve 14 is integrally mounted. The sleeve 14 is positioned in such a manner as to have an axis center common to the outer peripheral surface of the body portion 20, and is disposed such that the entire outer peripheral surface of the sleeve, except its axially opposite end portions, is covered with the body portion 20. The rotating shaft 12 is press fitted into a through-hole 14a of the sleeve 14 (see FIG. 10), whereby the rotating shaft 12 is integrally mounted to the body portion 20 via the sleeve 14. In the present embodiment, the sleeve 14 and the rotating shaft 12 constitute shaft means, so that the shaft means is mounted to the body portion 20 substantially integrally. The length of the rotating shaft 12 is set such that the rotating shaft 12 protrudes from the opposite side surfaces of the body portion 20 axially outwardly by predetermined lengths.

In the body portion 20, the plurality of the permanent magnets 16, and the plurality of the magnetic members 18 are integrally embedded. Each of the permanent magnets 16 is in substantially the same shape, and each of the magnetic members 18 is in substantially the same shape. The permanent magnets 16, and the magnetic members 18 are disposed radially in the body portion 20 with equal pitches and circumferentially alternately in intimate contact with each other. In this disposed state, the axially opposite side surfaces of each of the permanent magnets 16 and each of the magnetic members 18 are located on substantially the same planes. The wording "axial direction" means the axial direction common to the rotating shaft 12, sleeve 14, and body portion 20, accordingly, the axial direction of the rotor 4. Hereinbelow, "the axial direction," unless otherwise specified, is to mean the above direction.

Each of the magnetic members 18 formed of a magnetic material is composed of a laminate of a plurality of electromagnetic steel sheets having substantially the same shape, e.g., a laminate of a plurality of silicon steel sheets in the embodiment. Each of the magnetic members 18 has a radially outward end surface of an arcuate shape concentric with the rotating shaft 12, a radially inward end surface extending tangentially linearly, and circumferentially opposite side surfaces extending radially. In the circumferential center of the radially inward end surface, an escape-preventing protrusion 18a protruding radially inwardly is formed so as to extend in the axially entire region. A radially inward front end portion of each of the protrusions 18a fans out radially inwardly when viewed from the axial direction. When viewed axially, each of circumferentially opposed side surfaces of radially outward portions in the circumferentially opposite side surfaces is parallel to a straight line passing through the axis center and also passing through the circumferential center between the side surfaces, one of circumferentially opposed side surfaces of radially inward portions in the circumferentially opposite side surfaces is parallel to the straight line, and the other of the side surfaces forms a concave at an obtuse angle to the straight line. When viewed axially, the other side surface in the inward portion has the concave formed by two linear inclined surfaces. Between the circumferentially opposed side surfaces in the outward portions, a space portion (a body portion filling space portion) is formed which is in a nearly square, rectangular shape when viewed axially. Between the circumferentially opposed side surfaces in the inward portions, a space portion (a permanent magnet inserting/holding space portion) of a generally rectangular shape is formed which has a radial length slightly larger than a circumferential width when viewed axially. The circumferential width of the body portion filling space portion is larger than the circumferential width (maximum width) of the permanent magnet inserting/holding space portion. At the radial boundary between both types of space portions, r-shaped stepped portions are formed.

The shape of each of the magnetic members 18 may be expressed in another manner. Each of the magnetic members 18 has a projection 18b extending radially outwardly of each of the permanent magnets 16 (see FIG. 3). Outwardly of the radially outward end surface of each of the permanent magnets 16, space portions to be filled with the body portion 20 (the body portion filling space portions) are formed in the circumferential direction by the respective projections 18b. Similarly, space portions for inserting and holding the permanent magnets 16 in intimate contact (the permanent magnet inserting/holding space portions) are formed circumferentially by respective portions 18c (see FIG. 3) radially inward of the projections 18b in the magnetic members 18.

Figure 7:
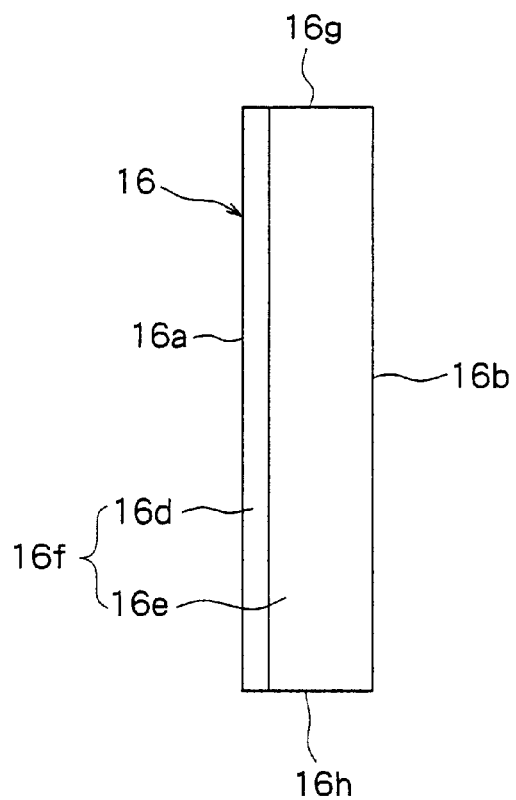
FIG. 7 is a plan view of a permanent magnet disposed in the rotor.
Figure 8:
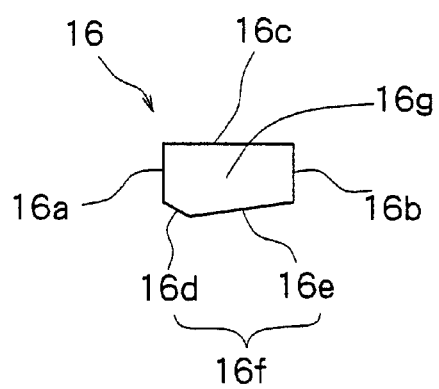
FIG. 8 is a side view of the permanent magnet when viewed from above in FIG. 7.

Each of the permanent magnets 16, for example, of the Nd-Fe-B type is inserted into and held in the above-described permanent magnet inserting/holding space portion, with the permanent magnet being in a non-magnetized state. As shown in FIGS. 7 and 8, each of the permanent magnets 16 is in the shape of an elongated, rectangular parallelopiped. However, as will be clear from the above description, one of the side surfaces, which forms each of the permanent magnet inserting/holding space portions, extends linearly, while the other of the side surfaces forms an obtuse-angled concave formed by two inclined surfaces. Thus, both side surfaces of each of the permanent magnets 16 to be inserted are also in a matching shape. More concretely, when viewed from a longitudinal direction (an up-and-down direction in FIG. 7) (namely, in FIG. 8), the permanent magnet 16 has one end surface 16a and the other end surface 16b spaced from each other and extending parallely and linearly, a side surface 16c extending linearly so as to intersect the one end surface 16a and the other end surface 16b perpendicularly, and the other side surface forming an obtuse-angled convex 16f from two linearly extending inclined surfaces 16d and 16e. One end surface 16g and the other end surface 16h in the longitudinal direction of the permanent magnet 16 each extends linearly so as to be perpendicular to the one end surface 16a and the other end surface 16b, as shown in FIG. 7. The cross-sectional shape of the permanent magnet 16 (substantially the same shape as the shape shown in FIG. 8) is set to be substantially the same over the distance from one end to the other end in the longitudinal direction. In the illustrated embodiment, when viewed longitudinally (in FIG. 8), the width of the one end surface 16a and the width of the other end surface 16b are set to be substantially the same, the length between the one end surface 16a and the other end surface 16b (i.e., the length of the one side surface 16c) is set to be about the sum (two times the width of the one end surface 16a or the other end surface 16b+α), and the longitudinal length (the length between the one end surface 16g and the other end surface 16h) is set to be about 10 times the width of the one end surface 16a or the other end surface 16b.

With reference to FIGS. 2 to 4, each of the permanent magnets 16 constituted as described above is inserted into and held in the permanent magnet inserting/holding space portion between the adjacent magnetic members 18. In the concave formed in the space portion, the convex 16f of the permanent magnet 16 is fitted and engaged. This concave-convex engagement structure reliably prevents the radially inward and outward escape of each of the permanent magnets 16 inserted between the magnetic members 18, thereby ensuring the retention of each of the permanent magnets 16, and facilitating assembly work. When each of the permanent magnets 16 has been mounted between the adjacent magnetic members 18, the radially outward end surface (16a) of each of the permanent magnets 16 is located circumferentially on nearly the same level as each of the stepped portions which extends circumferentially and defines part of the body portion filling space portion. On the other hand, the radially inward end surface (16b) is located circumferentially on nearly the same level as the radially inward end surface of the magnetic member 18 which defines the radially inward end of the permanent magnet inserting/holding space portion.

The body portion 20 comprising an aluminum alloy, a nonmagnetic material, is disposed in such a manner as to fill the gap between the radially inward surfaces of each of the permanent magnets 16 and each of the magnetic members 18 and the outer peripheral surface of the sleeve 14 (the gap forms a substantially annular space) and the above body portion filling space portion, and also as to cover the axially opposite side surfaces of each of the permanent magnets 16 and each of the magnetic members 18 over a predetermined thickness. Such disposition can be easily performed by casting, preferably die casting. Each of the magnetic members 18 is formed such that only its radially outward end surface forms an exposed surface appearing from the body portion 20, and the radially outward end surface is substantially coplanar with the outer peripheral surface of the body portion 20. That is, each of the permanent magnets 16 and each of the magnetic members 18 are integrated by the body portion 20. Of them, each of the permanent magnets 16 is completely embedded in the body portion 20, while each of the magnetic members 18 has only its radially outward end surface exposed, and has the other surfaces thereof all embedded in the body portion 20. In other words, the radially outward end surfaces of the respective magnetic members 18 are exposed such that they are partitioned at circumferentially equal intervals by segments of the body portion 20 filled into the body portion filling space portions, and that the axially opposite side surfaces of each of the magnetic members 18 are covered with the body portion 20 over a predetermined thickness. Each of the non-magnetized permanent magnets 16 can be magnetized from the exposed surface of each of the magnetic members 18. The respective magnetic members 18, in the completed form of the rotor 4 after molding, are arranged as discontinuous independent members separated from each other in the circumferential direction as stated above. Before molding, the magnetic members 18 are composed of a single magnetic material comprising a laminate of silicon steel sheets, in each of which the respective radially outward ends of the body portion filling space portions are connected together by arcuate thin bridge portions, whereby the entire outer peripheral edge makes a continuous circular shape. A single magnetic material comprising such silicon steel sheets is integrated with the sleeve 14 and each of the permanent magnets 16 by the body portion 20 to prepare an intermediate product of the rotor 4. Then, the intermediate product is cut so that the outer peripheral edge of the rotor 4 will be concentric with the sleeve 14, accordingly, the rotating shaft 12, whereby each of the bridge portions is removed. As a result, each of the segments of the body portion 20, which has been filled into the space portion radially inward of each of the bridge portions and whose radially outward surface has been covered with each of the bridge portions at the initial stage of molding, becomes exposed at the outer peripheral surface. Details of the method for producing the rotor 4 will be offered later on. The so processed intermediate product of the rotor 4 is brought to the finished form by press fitting the rotating shaft 12 into the sleeve 14.

The rotor 4 of the rotating machine 2 according to the present invention, as stated earlier, is composed merely of the sleeve 14 and the rotating shaft 12 constituting the shaft means, the body portion 20, the plurality of permanent magnets 16, and the plurality of magnetic members 18. Thus, the rotor 4 does not require many kinds of and large numbers of components as in the conventional rotor, but is comprised of a minimum of necessary components alone, so that its structure is simple and its number of components is small. Consequently, the rotor can be produced at a lower cost than before. Moreover, each of the permanent magnets 16 is completely embedded in (sealed up in) the body portion 20, thus obviating the need to apply a surface treatment for antioxidation. In this respect as well, a cost decrease can be achieved. Furthermore, because of the configuration of the rotor, each of the permanent magnets 16 and each of the magnetic members 18 can be molded integrally with the body portion 20 by casting such as die casting. Therefore, it is not necessary to gather and assemble many types of and large numbers of components as in conventional rotors. This makes production very easy and can shorten the manufacturing time. As a result, manufacturing at a lower cost than before can be performed. Besides, the shape of the permanent magnet 16 is relatively simple, and its production is also relatively easy.

In the rotor 4 of the rotating machine 2 according to the invention, the body portion 20 has a substantially circular outer peripheral surface and both side surfaces. Each of the permanent magnets 16 is completely embedded in the body portion 20, while each of the magnetic members 18 has only the radially outward end surface exposed, and has the other surfaces embedded in the body portion 20. Because of this configuration, the rotor is simple in structure as a whole, easy to produce, and can be manufactured at a low cost. In the rotor 4 of the rotating machine 2 according to the invention, moreover, each of the magnetic members 18 has the projection 18b extending radially outwardly of each of the permanent magnets 16. Outwardly of the radially outward end surface of each of the permanent magnets 16, the space portion 102A is formed circumferentially by the adjacent projections 18b. The body portion 20 is disposed so as to fill the gap between the radially inward surfaces of each of the permanent magnets 16 and each of the magnetic members 18 and the outer peripheral surface of the shaft means 14 (i.e. the gap 182, FIG. 9), also fill the space portions 102A, and further cover the axially opposite side surfaces of each of the permanent magnets 16 and each of the magnetic members 18 over a predetermined thickness. The exposed radially outward end surface of each of the magnetic members 18 is substantially coplanar with the outer peripheral surface of the body portion 20. This configuration makes it practically easy and possible to manufacture the rotor at a lower cost than conventional rotors. In the rotor 4 of the rotating machine 2 according to the invention, furthermore, the body portion 20 is filled into each of the space portions. Therefore, the radially outward escape of each of the permanent magnets 16 can be prevented reliably, and magnetic shielding between the radially outward end surfaces of each of the magnetic members 18 can be performed fully reliably.

Figure 10:
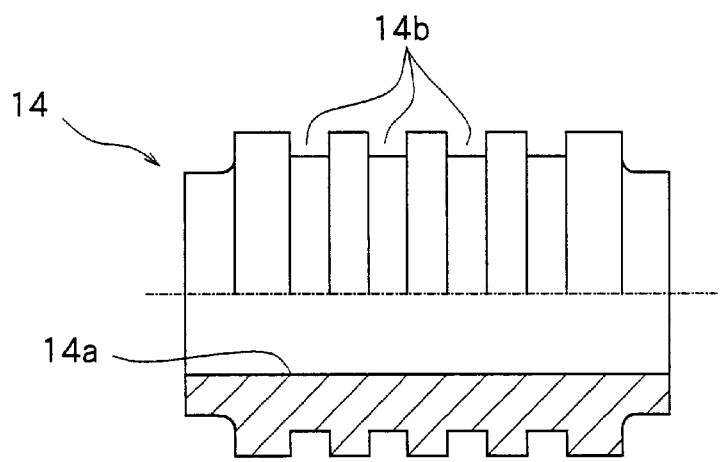
FIG. 10 is a side view of the sleeve, with its half relative to its axis being broken away.
Figure 13:
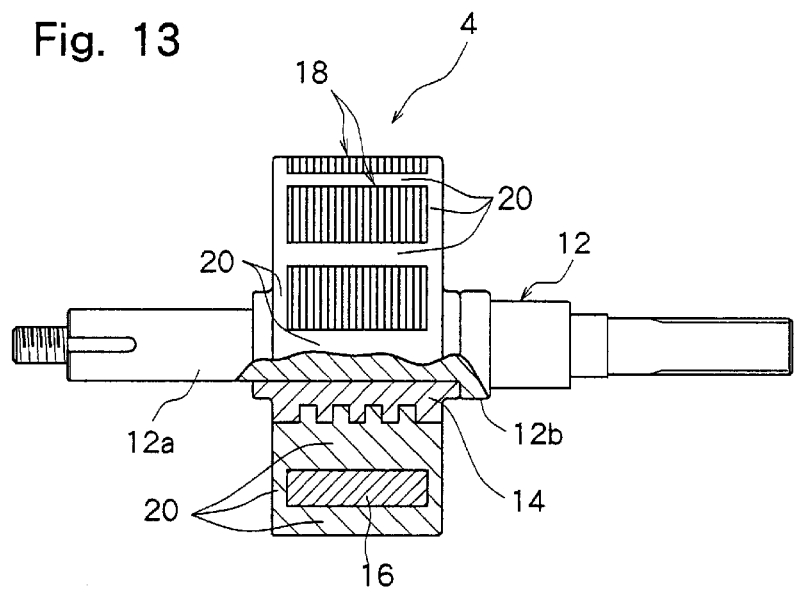
FIG. 13 is a view, partially broken away, of the rotor completed by mounting a rotating shaft to the intermediate product of the rotor illustrated in FIG. 12.

The method for producing the rotor 4 according to the invention configured as described above will be described in detail. The rotor 4, in the foregoing embodiment, is composed of the rotating shaft 12, the sleeve 14, the plurality of permanent magnets 16, the plurality of magnetic members 18, and the body portion 20. The members other than the body portion 20, whose molten metal material is poured into and pressurized in a mold (not shown) at the time of molding by die casting, are produced separately beforehand. Of them, the sleeve 14 has a through-hole 14a, and a plurality of annular grooves 14b formed with spacing in the axial direction on an outer peripheral surface of the sleeve, as shown in FIG. 10. When integral molding has been performed with the outer peripheral surface of the sleeve 14 being covered with the body portion 20, each of the annular grooves 14b is filled with a segment of the body portion 20. Thus, the axial escape of the sleeve 14 relative to the body portion 20 is reliably prevented. The rotating shaft 12, as shown in FIG. 13, has a press fittable portion 12a having an outer diameter set so that the portion 12a can be press fitted into the through-hole 14a of the sleeve 14 from one end side in the axial direction, and a large-diameter flange portion 12b provided at the other end of the press fittable portion 12a. The flange portion 12b has the function of a positioning stopper acting when the press fittable portion 12a is press fitted into the sleeve 14. Each of the permanent magnets 16 is formed by forming and sintering of a powder comprising a mixture of magnet materials, e.g., Nd, Fe and B, in predetermined proportions, by powder metallurgy, which may be a well known method per se, into the shape described earlier by reference to FIGS. 7 and 8. Each of the permanent magnets 16, in such a free state, has not been magnetized.

As explained previously, the respective magnetic members 18, in the finished form of the rotor 4 after molding (in the state molded as the intermediate product of the rotor 4 in the embodiment), are arranged as discontinuous independent members separated from each other in the circumferential direction. Before molding, the magnetic members 18 are composed of a single magnetic material comprising a laminate of silicon steel sheets, in each of which the respective radially outward ends of the respective body portion filling space portions are connected together by arcuate thin bridge portions, whereby the entire outer peripheral edge makes a continuous circular shape. After molding, the single magnetic material is separated into the respective magnetic members 18 as described above.

Figure 5:
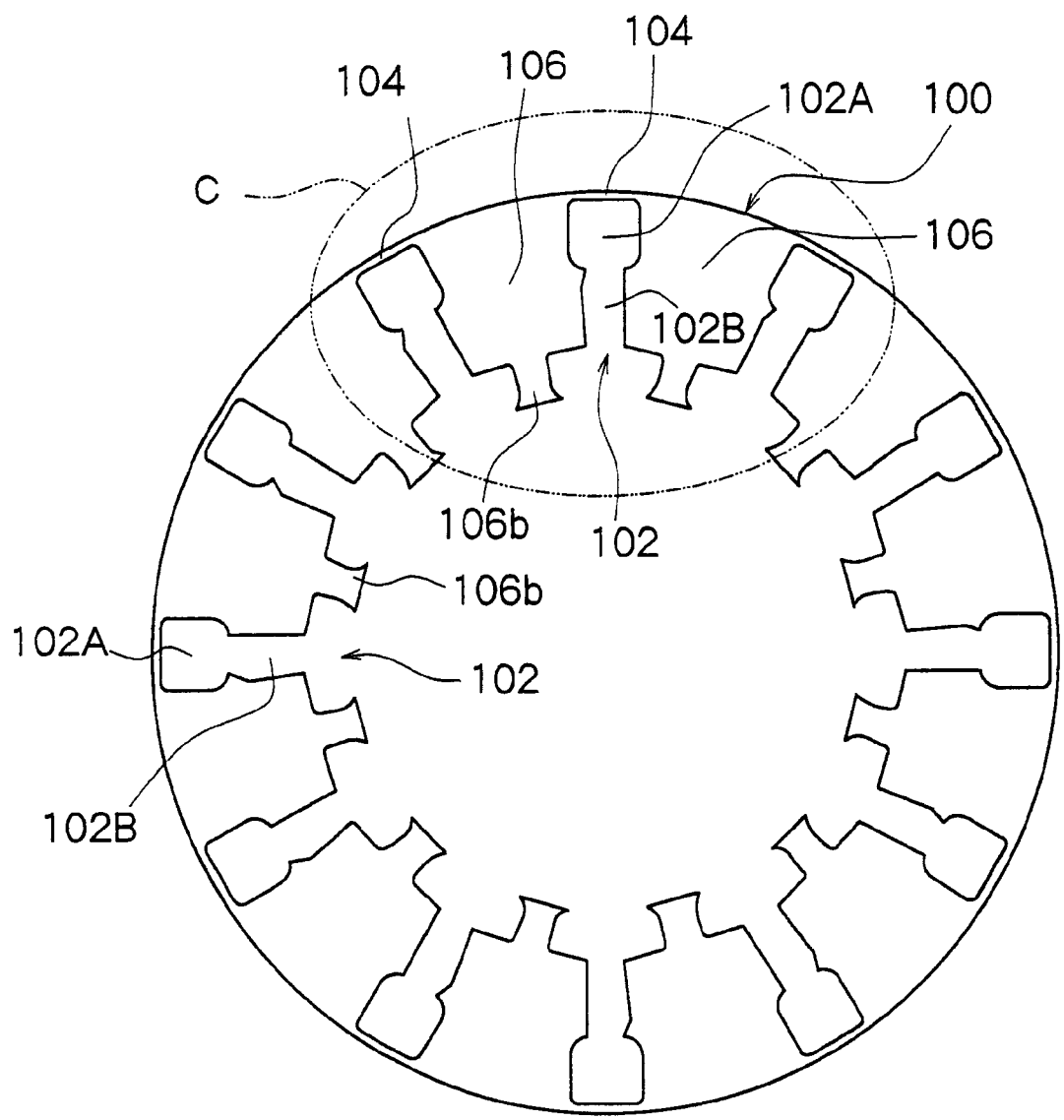
FIG. 5 is a plan view of an electromagnetic steel sheet for constituting magnetic members to be disposed in the rotor.
Figure 6:
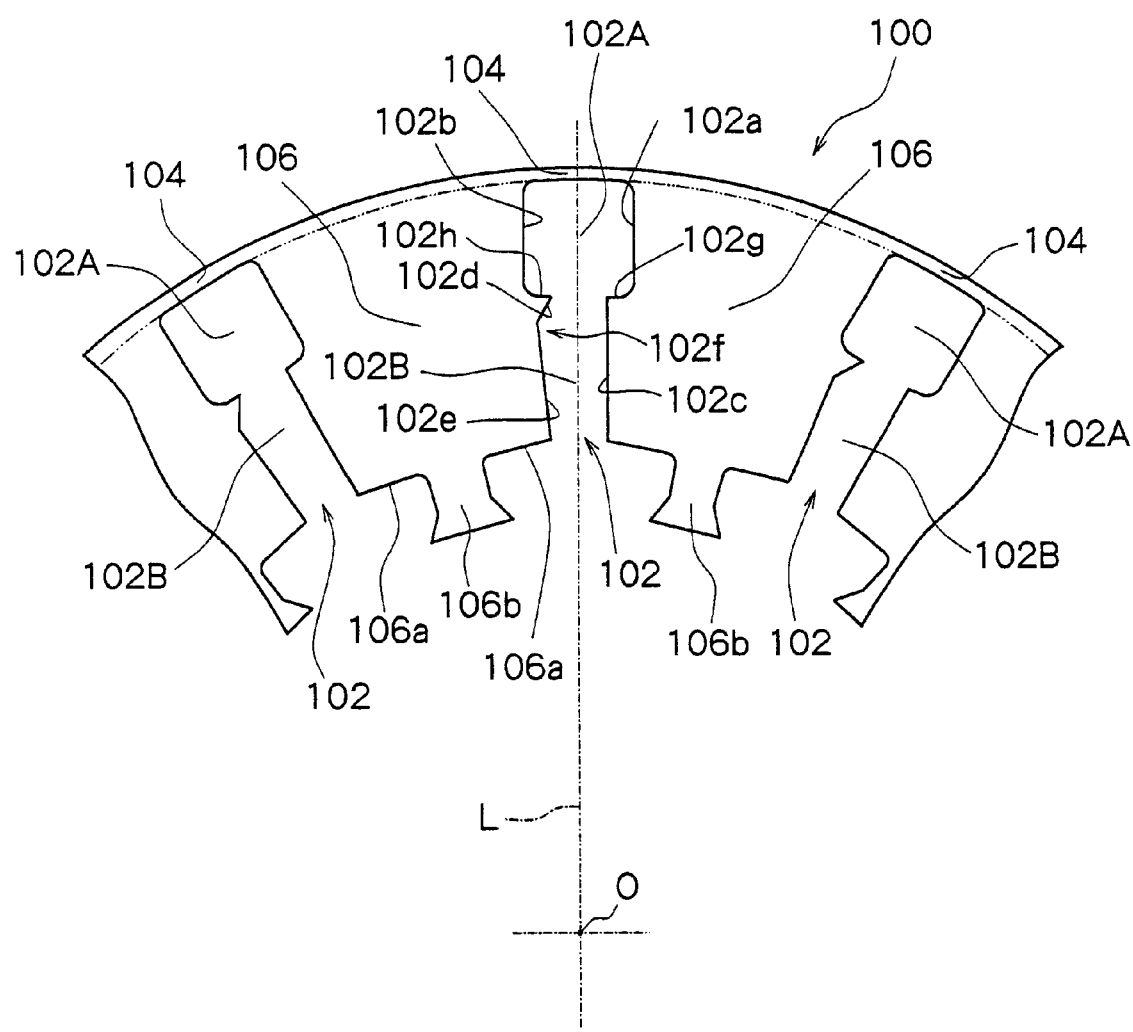
FIG. 6 is an enlarged view of a portion C of FIG. 5.

With reference to FIGS. 5 and 6, the numeral 100 denotes a metal plate comprising a magnetic material, or a silicon steel sheet as an embodiment of an electromagnetic steel sheet in the embodiment. The silicon steel sheet 100 has a basic shape nearly like a plain washer as a whole, which has an entirely continuous circular outer peripheral surface, and has a through-hole formed radially inwardly. In the silicon steel sheet 100, a plurality of slots 102 are formed so as to be circumferentially spaced from each other and arranged radially with equal pitch. Each of the slots 102 formed in substantially the same shape has one end open at a radially inward end, accordingly, in a portion defining an outer peripheral edge of the through-hole, and has the other end closed, with an arcuate bridge portion 104 concentric with an axis center O of the silicon steel sheet 100 being left between the other end and the outer peripheral surface. When viewed axially, each of circumferentially opposed side surfaces 102a and 102b of radially outward portions in each of the slots 102 extends linearly parallel to a straight line L passing through the axis center O of the silicon steel sheet 100 and also passing through the circumferential center between the side surfaces 102a and 102b, one of circumferentially opposed side surfaces, 102c, of radially inward portions extends linearly parallel to the straight line L, and the other of the side surfaces forms a concave 102f at an obtuse angle to the straight line L by two inclined surfaces 102d and 102e extending linearly.

Between the side surfaces 102a and 102b in the outward portions in each of the slots 102, a space portion (the aforementioned body portion filling space portion) 102A is formed which is in a nearly square, rectangular shape when viewed axially. Between one of the side surfaces, 102c, in the inward portions and the other of the side surfaces, 102d and 102e, a space portion (the aforementioned permanent magnet inserting/holding space portion) 102B of a generally rectangular shape is formed which has a radial length slightly larger than a circumferential width when viewed axially. The circumferential width of the body portion filling space portion 102A is larger than the circumferential width (maximum width defined by the site of presence of the concave 102f) of the permanent magnet inserting/holding space portion 102B. At the radial boundary between both types of space portions 102A and 102B, stepped portions 102g and 102h including an r-shape are formed. Of the other of the side surfaces (102d and 102e) defining the space portion 102B, the side surface 102d is formed at a position radially outwardly of the side surface 102e, and the entire length of the side surface 102d is shorter than the entire length of the side surface 102e. The space portion 102B in each of the slots 102 has substantially the same shape as the aforementioned cross-sectional shape of the permanent magnet 16 (see FIG. 8) (more strictly, the permanent magnet 16 is larger than the space portion 102B by an amount to be press fitted).

Since the slots 102 are formed in the silicon steel sheet 100, bases 106 circumferentially spaced from each other by the slots 102 and radially arranged with equal pitch are formed in the silicon steel sheet 100. The radially inward end 106a of each of the bases 106 formed to have substantially the same shape (the radially inward end defining a part of the outer peripheral edge of the through-hole of the silicon steel sheet 100) extends linearly in a direction tangential to the through-hole. In the circumferential center of the radially inward end 106a of each of the bases 106, an escape-preventing protrusion 106b protruding radially inwardly is formed. A radially inward front end portion of each of the protrusions 106b fans out radially inwardly when viewed from the axial direction.

The so constituted silicon steel sheet 100 can be easily formed by punching a flat sheet by means of a press. A plurality of silicon steel sheets 100 formed by punching (e.g., 40 silicon steel sheets 100 1.0 mm thick) are aligned and laminated to form a magnetic material 180 of a substantially cylindrical shape having a circular outer peripheral surface, having the slots 102 arranged radially with spacing in the circumferential direction, the slot having one end radially inwardly open and the other end closed, with the arcuate bridge portion 104 being left between the other end and the outer peripheral surface, namely, the magnetic material 180 being a laminate of plural silicon steel sheets 100 (see FIG. 9). To hold the magnetic material 180 integrally as a laminate of silicon steel sheets 100, it is preferred to apply a suitable fixing means, such as stake or welding, on the outer peripheral surface of each of the silicon steel sheets 100.

Figure 9:
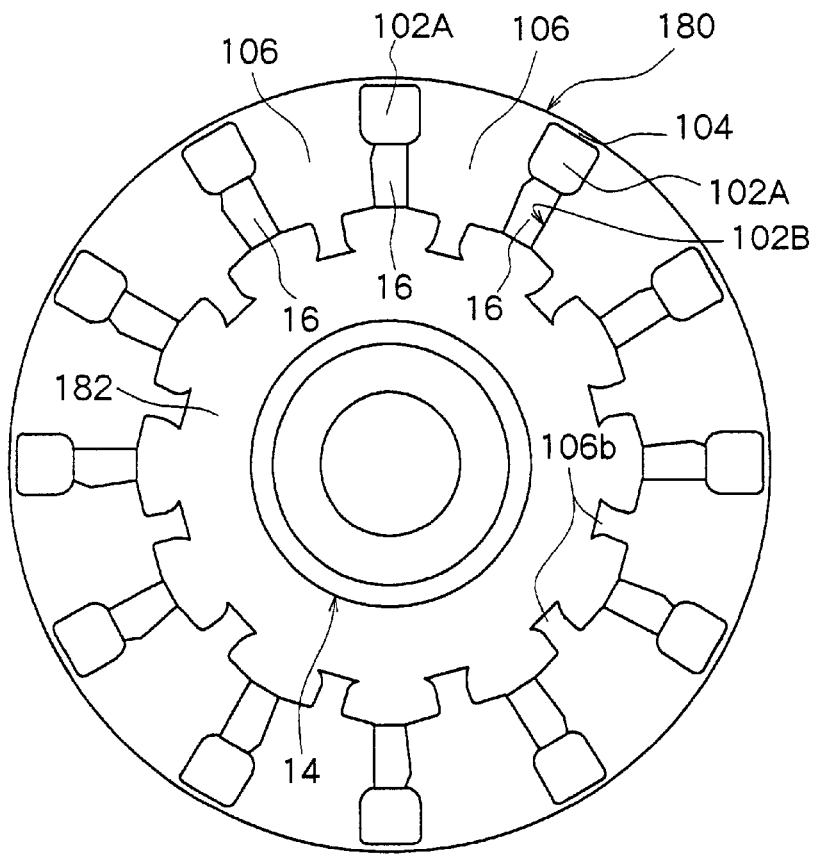
FIG. 9 is a view showing, from an axial direction, a state in which a sleeve is disposed on an axis center in common with an axis center of a magnetic material composed of a laminate of the electromagnetic steel sheets illustrated in FIG. 5.

After formation of the magnetic material 180 by lamination of the silicon steel sheets 100, the permanent magnet 16 in a non-magnetized state is inserted into and held in the permanent magnet inserting/holding space portion 102B in each of the slots 102 such that the body portion filling space portion 102A is left between the permanent magnet inserting/holding space portion 102B and the bridge portion 104 (see FIG. 9). Insertion of each of the permanent magnets 16 into the corresponding space portion 102B is performed by press fitting in the embodiment. With reference to FIG. 9, the permanent magnet 16 is inserted into and held in each of the slots 102 of the magnetic material 180, whereafter the sleeve 14 is set in alignment with the axis center of the magnetic material 180. The concentrical setting of the magnetic material 180 and the sleeve 14 is carried out in a mold (not shown) for die casting. An annular space portion (body portion filling space portion) 182 is formed between the radially inward site of the magnetic material 180 and the permanent magnets 16 and the outer peripheral surface of the sleeve 14.

Then, die casting, which may employ a well known method per se, is performed by pouring a molten aluminum alloy, a nonmagnetic material, into a mold under pressure. That is, the molten aluminum alloy is filled into each of the body portion filling space portion 182 between the magnetic material 180 and each of the non-magnetized permanent magnets 16 and the sleeve 14 and into each of the body portion filling space portions 102A. Also, the axially opposite side surfaces of the magnetic material 180 and each of the permanent magnets 16 are covered with the aluminum alloy to a predetermined thickness. The sleeve 14, the magnetic material 180, and each of the permanent magnets 16 are thus integrally cast into the resulting body portion 20 (see FIGS. 2 and 3). After the so integrally molded intermediate product of the rotor 4 is withdrawn from the mold, and cooled. Then, the outer peripheral surfaces of the body portion 20 and the magnetic material 180 are cut about the axis center of the sleeve 14 to cut off each of the bridge portions 104 (see FIGS. 11 and 12). The so cut outer peripheral surface of the intermediate product of the rotor 4 is formed coaxially with the sleeve 14. In FIG. 6, an arcuate portion shown by a two dot chain line represents a cut-scheduled surface to be cut by the above cutting operation. This cutting margin is provided to a degree to which at least each of the bridge portions 104 of the magnetic material 180 is completely cut.

Figure 11:
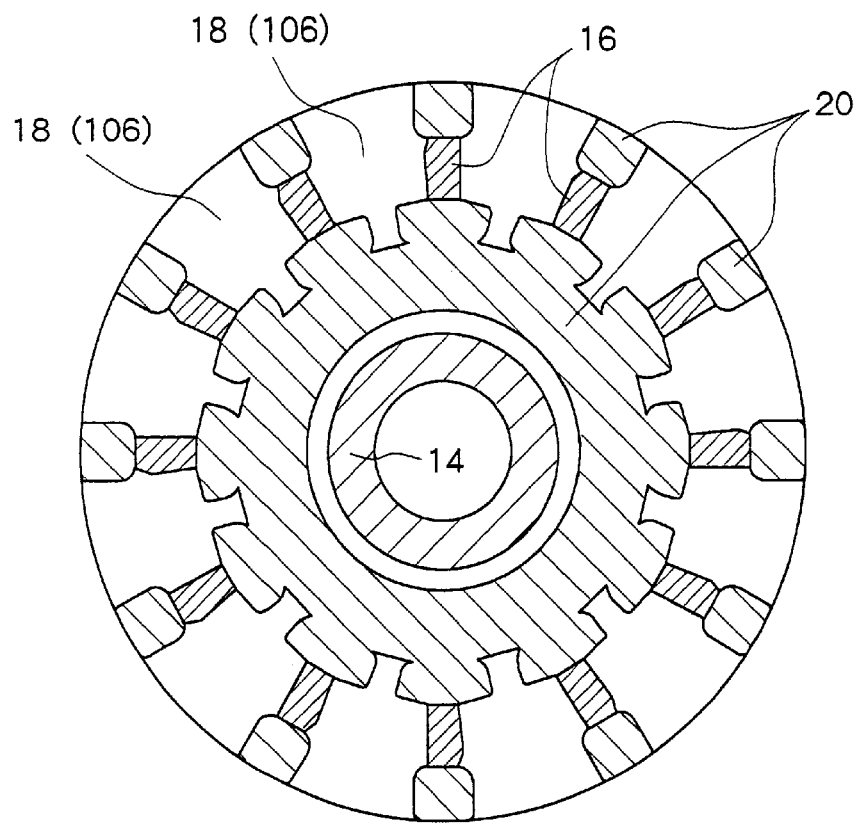
FIG. 11 is a sectional view showing, from an axial direction, a state in which an outer peripheral surface of an intermediate product of the rotor (an intermediate product of the rotor having no rotating shaft mounted therein) molded by die casting as in FIG. 9 has been partially removed by cutting.
Figure 12:
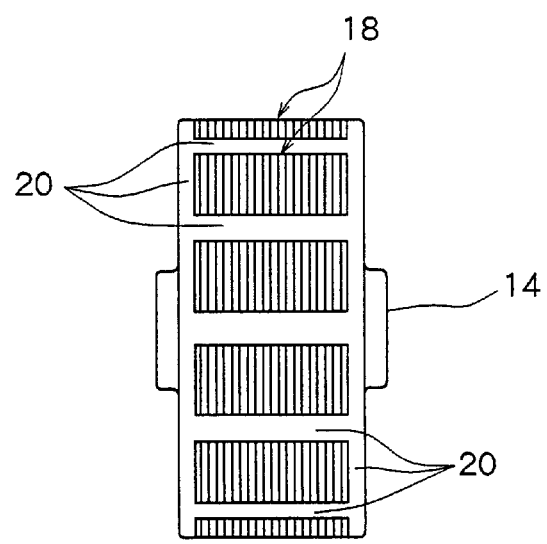
FIG. 12 is a view of the intermediate product of the rotor illustrated in FIG. 11, as viewed from a radially outward direction.

With reference to FIGS. 11 and 12, as a result of the above cutting operation, segments of the body portion 20, which have been filled into the space portions 102A radially inward of the bridge portions 104 and whose radially outward surfaces were covered with the bridge portions 104 initially at the time of molding, are exposed at the outer peripheral surface. As a result of the cutting, moreover, the magnetic material 180 composed of the laminate of the silicon steel sheets 100 is converted into a plurality of magnetic members 18 separated from each other circumferentially (corresponding to the bases 106 before separation), and the radially outward end surface of each of the magnetic members 18 forms an exposed surface appearing from the body portion 20 and is located substantially coplanar with the outer peripheral surface of the body portion 20. Then, if necessary, the axially opposite side surfaces of the intermediate product of the rotor 4 are cut. Then, the rotating shaft 12 is press fitted into the sleeve 14 in the intermediate product of the rotor 4 to complete the configuration (constitution) of the rotor 4 (see FIG. 13). Then, rotation balancing of the rotor 4 is performed, whereafter magnetism is imparted, from the exposed surface being the outer peripheral surface of each of the magnetic members 18, to each of the non-magnetized permanent magnets 16 embedded in the body portion 20. The magnetism is applied to each of the exposed surfaces of the magnetic members 18 by a magnetizing device (not shown) so as to produce a circumferentially heteropolar arrangement (N–S). As a result, magnetization is performed on the circumferentially opposite side surfaces (one of the side surfaces, 16c, and the remaining side surfaces 16d and 16e in FIG. 8) of the non-magnetized permanent magnet 16 interposed between the magnetic members 18 circumferentially in intimate contact, whereby magnetic poles are formed on the circumferentially opposite surfaces. This magnetizing action results in magnetization such that circumferentially opposed side surfaces in the magnetized permanent magnets 16, which sandwich the magnetic members 18 therebetween, are homopolar (N—N, S—S) (see FIG. 3).

According to the method for producing the rotor 4 of the rotating machine 2 of the invention, each of the permanent magnets 16 is held by the single magnetic material 180. Then, each of the permanent magnets 16 and the magnetic material 180 are molded integrally with the sleeve 14 by the body portion 20 formed from the molten nonmagnetic material (formed by die casting). Then, the outer peripheral surfaces of the body portion 20 and the magnetic material 180 are cut to cut off the bridge portions 104 of the magnetic material 180. By so doing, the magnetic material 180 is converted into a plurality of magnetic members 18 circumferentially separated from each other. Also, the radially outward end surface of each of the magnetic members 18 is made to form an exposed surface appearing from the body portion 20, and the exposed surface is positioned to be substantially coplanar with the outer peripheral surface of the body portion 20. Then, each of the non-magnetized permanent magnets 16 is magnetized from the exposed surface of each of the magnetic members 18, whereby the rotor 4 of the rotating machine can be produced. Consequently, it is not necessary to gather and assemble many kinds of and a large number of components. The man-hours for assembly are few, manufacture becomes very easy, the burden on labor is reduced, and the manufacturing time can be markedly shortened. Thus, the rotor of the invention can be manufactured at a lower cost than before. The rotor 4 is composed merely of the shaft means, the body portion, the plurality of permanent magnets, and the plurality of magnetic members. Thus, the rotor 4 does not require many kinds of and large numbers of components as in the conventional rotor, but is comprised of a minimum of necessary components alone. This is also a factor facilitating production. Moreover, each of the permanent magnets is completely embedded in (sealed up in) the body portion 20, thus obviating the need to apply a surface treatment for antioxidation. In this respect as well, a cost decrease can be achieved.

With reference to FIGS. 1 to 4, radial ball bearings (hereinafter referred to simply as "bearings") 22 and 24 are press fitted and mounted on outward projections, beyond both side walls of the body portion 20, of the rotating shaft 12 in the rotor 4 manufactured as above on axially opposite sides of the body portion 20 of the rotor 4, a pair of case members 6 and 8 are supported relatively rotatably on the rotating shaft 12 via the bearings 22 and 24. The case members 6 and 8 have en through-holes, which are press fitted with the bearings 22 and 24, whereby the case members 6 and 8 are supported relatively rotatably on the rotating shaft 12. The pair of case members 6 and 8 have ventilation holes. Between the pair of case members 6 and 8, the stator 10 is mounted in such a manner as to cover the outer peripheral surface of the rotor 4 with a gap provided therebetween. The stator 10 of a nearly cylindrical shape is integrally molded from a magnetic material, such as an iron material or a steel material. In the stator 10, slots 30 extending axially are formed with spacing in the circumferential direction. A winding 32 comprising a bundle of copper wires is inserted into and held in each of the slots 30 on the stator 10, dust covers 40 and 42 are mounted for covering an outer surface portion of the rotor 4 which is not covered with the stator 10. The dust covers 40 and 42 are formed from heat resistant synthetic resin, and can prevent dust, such as iron powder, from being attracted and sucked into the rotor 4, etc. To an end portion of the rotating shaft 12, a cooling fan 34 and a pulley for rotational driving are integrally mounted by a bolt 38. The pulley 36 is drivingly connected to a drive source, for example, a crankshaft of an engine via a V-belt and other power transmission means (not shown). In the so constituted rotating machine 2 as an electric generator, when the engine is actuated, the rotor 4 is rotationally driven by the power transmission means, pulley 36 and rotating shaft 12. Thus, an electric current is produced in the windings 32 disposed in the stator 10 to generate electric power. When the engine is stopped, the rotation of the rotor 4 is stopped to terminate electric power generation.

Figure 14:
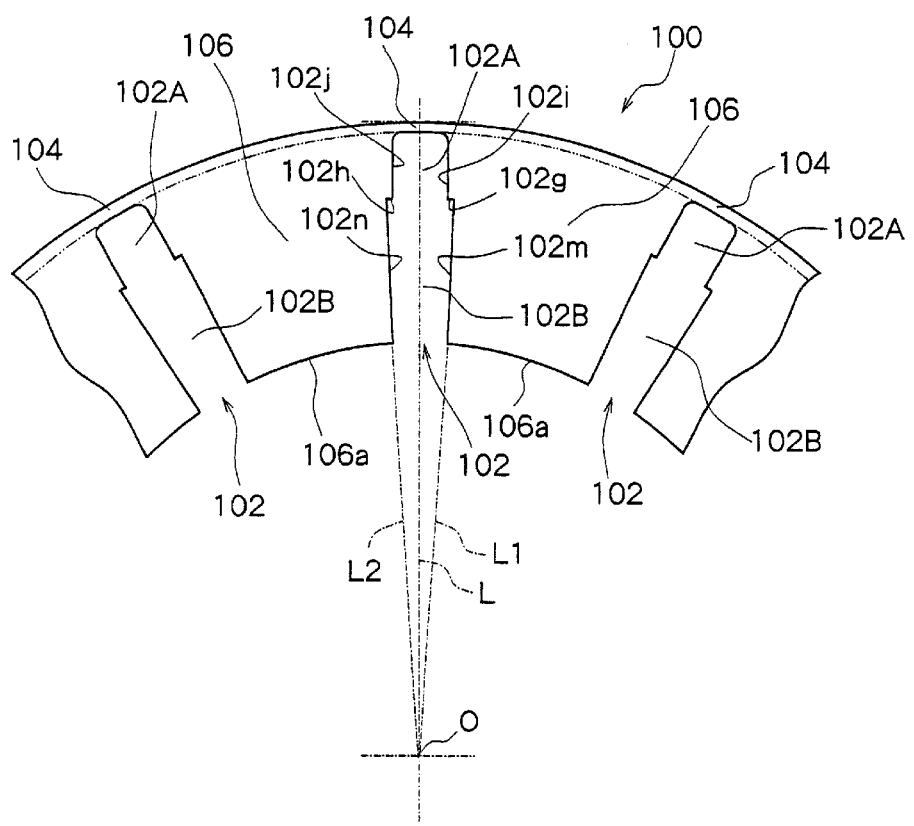
FIG. 14 is a plan view, like FIG. 6, showing an essential portion of another embodiment of the electromagnetic steel sheet for constituting the magnetic members to be disposed in the rotor.

FIG. 14 shows an essential portion of another embodiment of the silicon steel sheet 100 which is an electromagnetic steel sheet. In the silicon steel sheet 100 shown in FIG. 14 (the silicon steel sheet 100 viewed in the axial direction), each of circumferentially opposed side surfaces 102i and 102j constituting the body portion filling space portion 102A of each of the aforementioned slots 102 extends linearly parallel to the aforementioned straight line L. Circumferentially opposed side surfaces 102m and 102n constituting the permanent magnet inserting/holding space portion 102B are present on straight lines L1 and L2 passing the axis center 0 and extending radially while circumferentially sandwiching the straight line L in a symmetrical relationship. Each of the body portion filling space portions 102A is in a nearly square rectangular shape when viewed axially. Each of the permanent magnet inserting/holding space portions 102B, when viewed axially, is in a generally rectangular shape having a larger radial length than a circumferential width thereof, and is also in a generally trapezoidal shape having a circumferential width gradually narrowing from its radially outward end toward its radially inward end.

The circumferential width of each of the body portion filling space portions 102A is smaller than the circumferential width of the corresponding permanent magnet inserting/holding space portion 102B (i.e. the maximum width defined by the radially outward end). At the radial boundary between both space portions 102A and 102B and at the radially outward end of the space portion 102B, stepped portions 102g and 102h extending circumferentially are formed. The permanent magnet 16 (not shown) of nearly the same cross sectional shape as the permanent magnet inserting/holding space portion 102B is inserted into and held in each of the space portions 102B. Each of the space portions 102B has the circumferential width at the radially inward end made smaller than the circumferential width at the radially outward end thereof, and the stepped portions 102g and 102h are formed at the radially outward end. Thus, the radially inward and outward escape of the inserted permanent magnet 16 can be prevented reliably, ensuring stable holding. A radially inward end 106a of each of bases 106 circumferentially spaced from each other by the slots 102 and radially arranged with equal pitch is in an arcuate shape concentric with the axis center O.

The silicon steel sheets 100 constituted as above are laminated to form one magnetic material 180 as in the previous embodiments. The permanent magnets 16 are inserted into and held in the slots 102. Then, the rotor 4 can be manufactured by substantially the same method as in the previous embodiments, and substantially the same actions and effects can be obtained. The shape of the silicon steel sheet 100 shown in FIG. 14 is simplified in comparison with the shape of the silicon steel sheet 100 in the previous embodiments. Thus, its manufacture is even easier, and can be produced at a lower cost. The shape of the permanent magnet 16 is also further simplified, and its manufacture is even easier.

Figure 15:
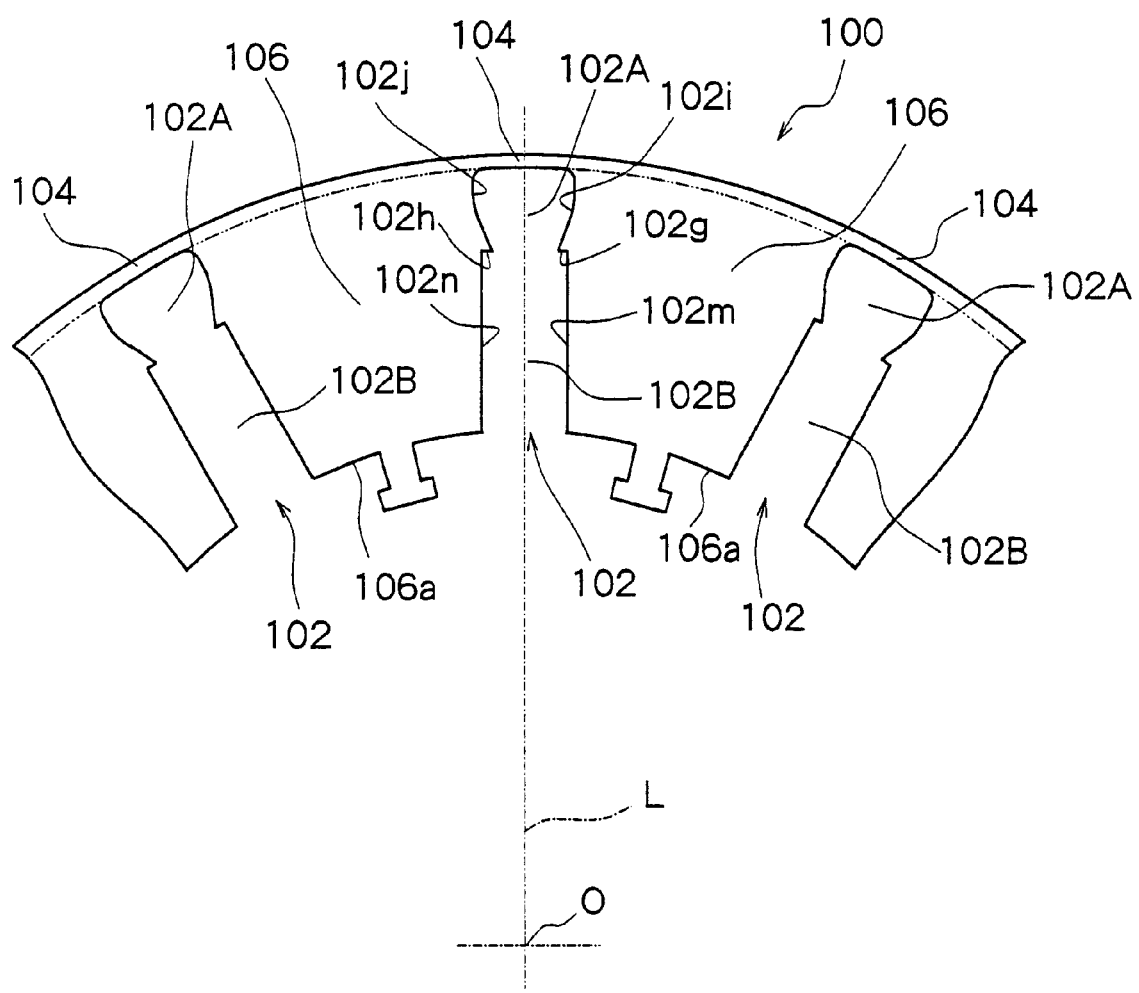
FIG. 15 is a plan view, like FIG. 6, showing an essential portion of still another embodiment of the electromagnetic steel sheet for constituting the magnetic members to be disposed in the rotor.

As shown in FIG. 15 another embodiment is feasible in which the side surfaces 102m and 102n of the space portion 102B extend parallel to the straight line L. In this embodiment, each of the space portions 102B is substantially rectangular when viewed axially, and the cross sectional shape of the permanent magnet 16 inserted and held is also nearly rectangular (oblong). Thus, the shape of the permanent magnet 16 is further simplified, and its manufacture is easier, so that it can be manufactured at a lower cost The radially inward escape of the permanent magnet 16 inserted in the space portion 102B can be prevented by performing the insertion of the permanent magnet 16 by press fitting. In the embodiment shown in FIG. 15, the circumferential width at radially outward end portions of the circumferentially opposed side surfaces 102i and 102j constituting the body portion filling space portion 102A in each of the slots 102 is greater than the circumferential width at the corresponding ends in the space portion 102A shown in FIG. 14

Figure 16:
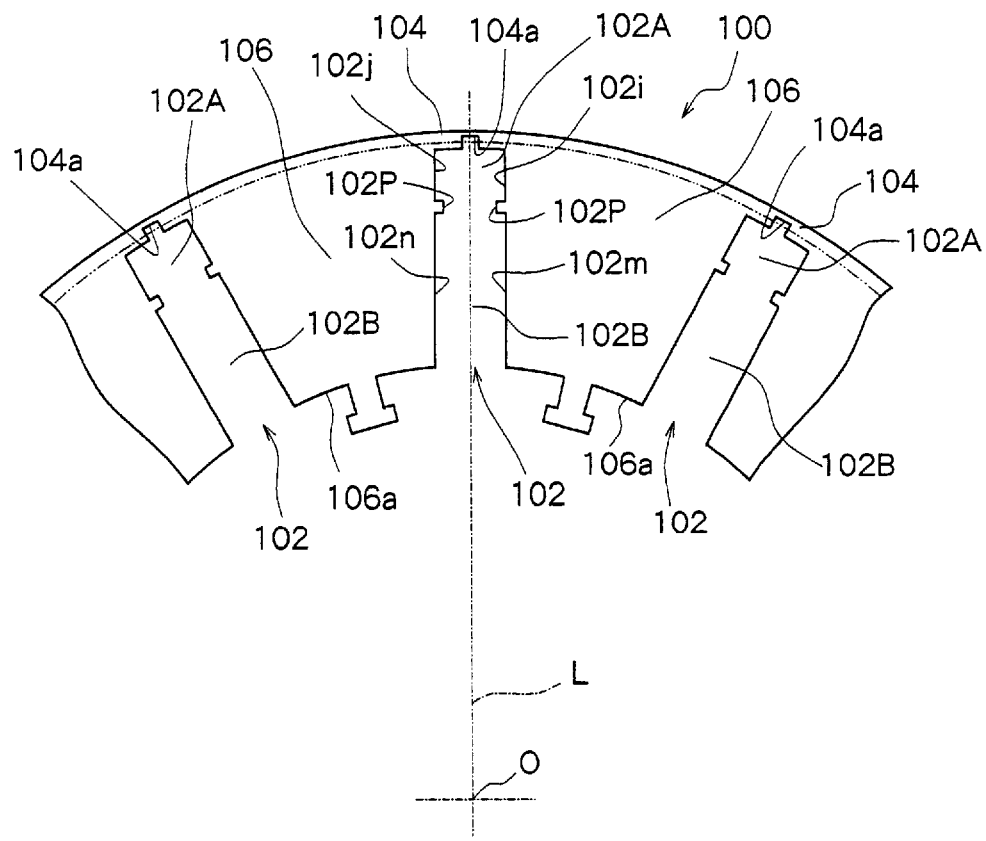
FIG. 16 is a plan view, like FIG. 6, showing an essential portion of a further embodiment of the electromagnetic steel sheet for constituting the magnetic members to be disposed in the rotor.

FIG. 16 shows an essential portion of a further embodiment of the silicon steel sheet 100 as an electromagnetic steel sheet In the silicon steel sheet 100 shown in FIG. 16, side surfaces 102i and 102j of the space portion 102A, and side surfaces 102m and 102n of the space portion 102B are formed to extend parallel and linearly at equal distances from the straight line L. Each of the space portions 102A is in a nearly square rectangular shape when viewed axially. Each of the space portions 102B, when viewed axially, is in a generally rectangular shape having a larger radial length than a circumferential width thereof Protuberances 102P jutting in circumferentially mutually approaching directions are formed at the axial boundary between each of the space portions 102A and the corresponding space portion 102B. Each of the protuberances 102P is in a rectangular shape when viewed axially. At the circumferential center of each of the bridge portions 104 of an arcuate shape concentric with an axis center O of the silicon steel sheet 100, a notch 104a is formed which extends radially outwardly from a radially inward end surface of the bridge portion 104. Each of the notches 104a of substantially the same shape and size has side surfaces of equal length extending linearly parallel at equal distance from the axial line L, and a front end surface extending circumferentially between the radially outward ends of the side surfaces, and is in the shape of a channel when viewed axially. A cut-scheduled surface shown by two-dot chain lines in FIG. 16 is provided so as to pass through nearly the axial center of each of the bridge portion 104. Of course, the cut-sheduled surface is positioned on a circular outer peripheral surface having an axis center in common with the axis center O of the silicon steel sheet 100. The front surface of the notch 104a is formed to lie at a position slightly radially outward of the cut-scheduled surface.

Figure 17:
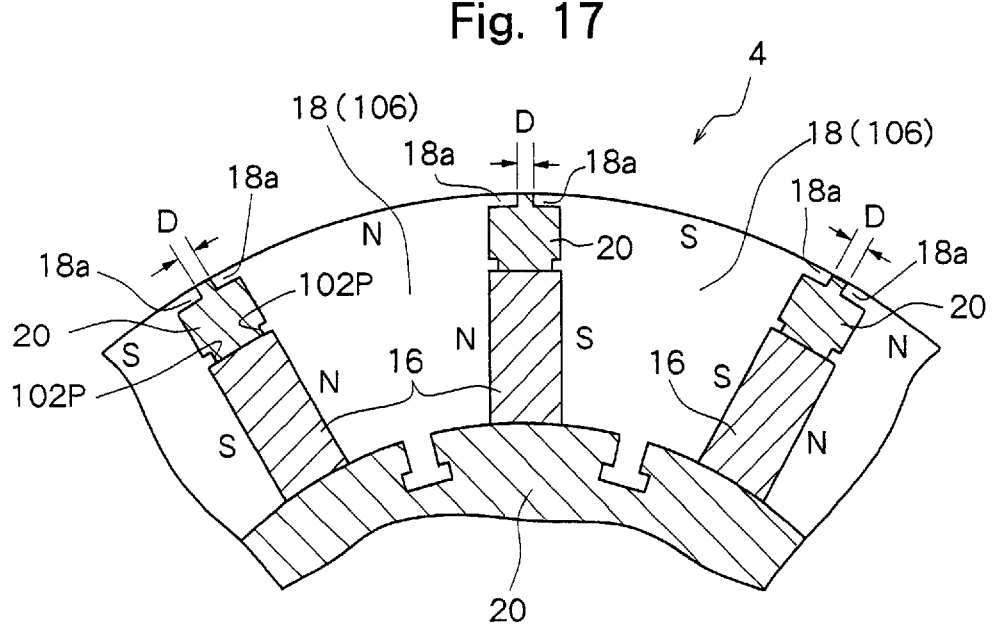
FIG. 17 is a partial sectional view showing, from an axial direction, an essential portion of the rotor molded by die casting with the use of the electromagnetic steel sheet shown in FIG. 16.

The silicon steel sheets 100 constituted as above are laminated, whereby one magnetic material 180 (see FIG. 9) as in the previous embodiments can be formed. In the space portion 102B in each of the slots 102, a permanent magnet 16 (see FIG. 17) having a rectangular cross sectional shape, which is nearly the same as that of the space portion 1023, is inserted and held. Then, an intermediate product of the rotor 4 can be manufactured by substantially the same method as in the previous embodiments. Needless to say, an aluminum alloy, a nonmagnetic material, is filled into the space portion 102A including the notch 104a, and the aluminum alloy filled into each of the space portions 102A constitutes a segment of the body portion 20. The outer peripheral surfaces of the body portion 20 and the magnetic material 180 of the intermediate product are cut up to the cut-scheduled surface. With reference to FIG. 17, this cutting removes the radially outward portion of each of the bridge portions 104, and retains the radially inward portion of each of the bridge portions, with the radially middle part thereof as the boundary. The front end portion in the notch 104a formed in each of the bridge portions 104, which is slightly radially outward of the cut-scheduled surface, and part of the aluminum alloy filled in the front end portion are also cut. In other words, the outer peripheral surfaces of the body portion 20 and the magnetic material 180 are cut about the axis center so that the bridge portions 104 will be circumferentially separated via the aluminum alloy filled into the notches 104a. As a result, the magnetic material 180 is divided into the magnetic members 18 separated from each other in the circumferential direction. A segment of the body portion 20 covered radially outwardly with each of the bridge portions 104 has the outer peripheral surface exposed only at the site of the notch 104a. Then, the rotor 4 can be completed in the same manner as described earlier.

In the rotor 4 including the constitution shown in FIG. 17, overhangs 18a extending in circumferentially mutually approaching directions from circumferentially opposed side surfaces and being opposed with a circumferential gap D therebetween are formed in radially outward edge portions of adjacent magnetic members 18. Each of these overhangs 18a is a radially inward portion of each of the bridge portions 104 which has been left behind by the above-mentioned cutting operation. The exposed radially outward end surface of the magnetic member 18 includes the radially outward end surfaces of the overhangs 18a. A segment of the body portion 20 is disposed so as to fill the space portion 102A defined by the radially outward end surface of each of the permanent magnets 16, the side surfaces of the adjacent magnetic members 18 circumferentially opposed radially outwardly of the end surface, and the opposed surfaces and radially inward side surfaces of the circumferentially opposed overhangs 18a. The exposed radially outward end surfaces of the magnetic members 18 are partitioned at equal intervals by the segments of the body portion 20 disposed so as to fill the circumferential gaps D between the opposed overhangs 18a.

The previously explained embodiment of the rotating machine 2, for example, the rotating machine 2 shown in FIG. 3, includes the rotor 4 having no overhangs 18a in the adjacent magnetic members 18, and the stator 10. In the rotating machine 2, the exposed radially outward end surfaces of the magnetic members 18 constitute magnetic poles. The magnetic poles are circumferentially alternately heteropolar (N, S, N . . . ), and circumferentially partitioned by the segments of the body portion 20 comprising a nonmagnetic material. The cross sectional surface of the segment of body portion 20 is in a nearly square rectangular shape, and the circumferential width of the exposed radially outward end surface of the segment of the body portion 20 is relatively large in order to prevent magnetic leakage. According to this constitution, however, the magnetic flux density in the radial direction of the rotor 4 tends to be concentrated at the circumferentially opposite ends of the exposed radially outward end surface of the magnetic member 18, i.e., at the boundary between the exposed radially outward end surface of the segment of the body portion 20 and that of the adjacent magnetic members 18. That is, the magnetic flux density at the boundary on the N pole side of the circumferentially adjacent magnetic poles sandwiching the segment of the body portion 20 is high on the positive side, while the magnetic flux density at the boundary on the S pole side is high on the negative side. Changes in the magnetic flux density between both sides tend to be abrupt. When relative movement relative to the stator 10 occurs following rotation of the rotor 4, cogging torque developing between the rotor 4 and the stator 10 due to sudden changes in the magnetic flux density becomes great excessively, and may inhibit smooth high speed rotation.

In the rotor 4 including the constitution shown in FIG. 17, on the other hand, the overhangs 18a extending in circumferentially mutually approaching directions from circumferentially opposed side surfaces and being opposed with the circumferential gap D therebetween are formed in the radially outward edge portions of adjacent magnetic members 18. Thus, slight magnetic leakage is caused between the front ends of the overhangs 18a. As a result, the tendency toward concentration of the magnetic flux density at the boundary of the magnetic members 18 is alleviated. Moreover, changes in the magnetic flux density between the positive side and the negative side are modified to become relatively mild. Thus, the cogging torque during rotation of the rotor 4 can be diminished. In the rotor 4 including the constitution shown in FIG. 17, furthermore, the presence of the overhangs 18a can increase the rigidity of the entire rotor 4. This is advantageous during high speed rotation.

Figure 18:
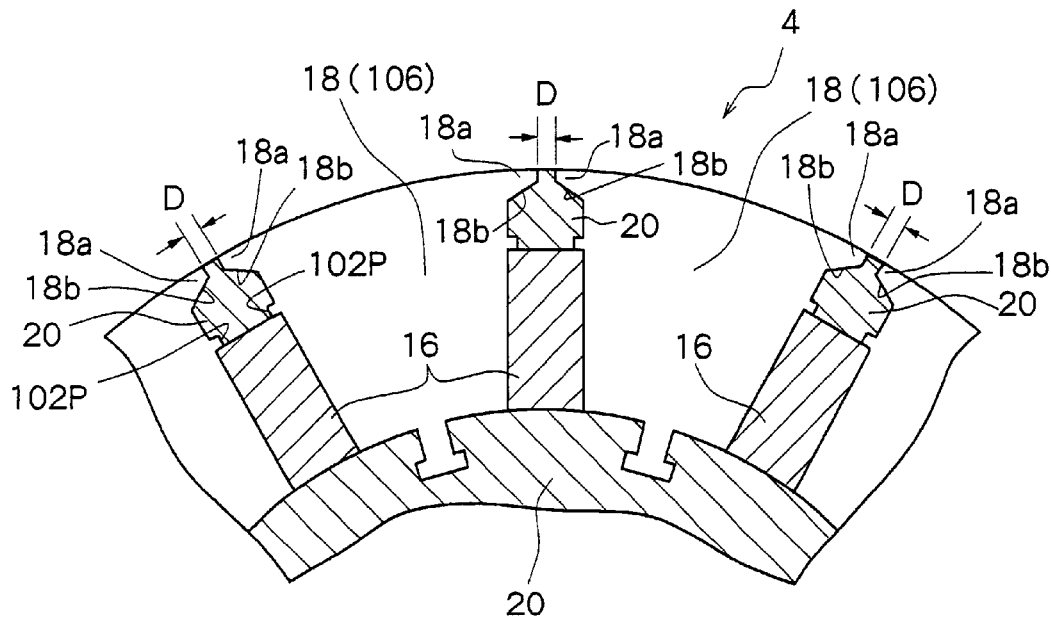
FIG. 18 is a partial sectional view showing, from an axial direction, an essential portion of a modified example of the rotor shown in FIG. 17.
Figure 19:
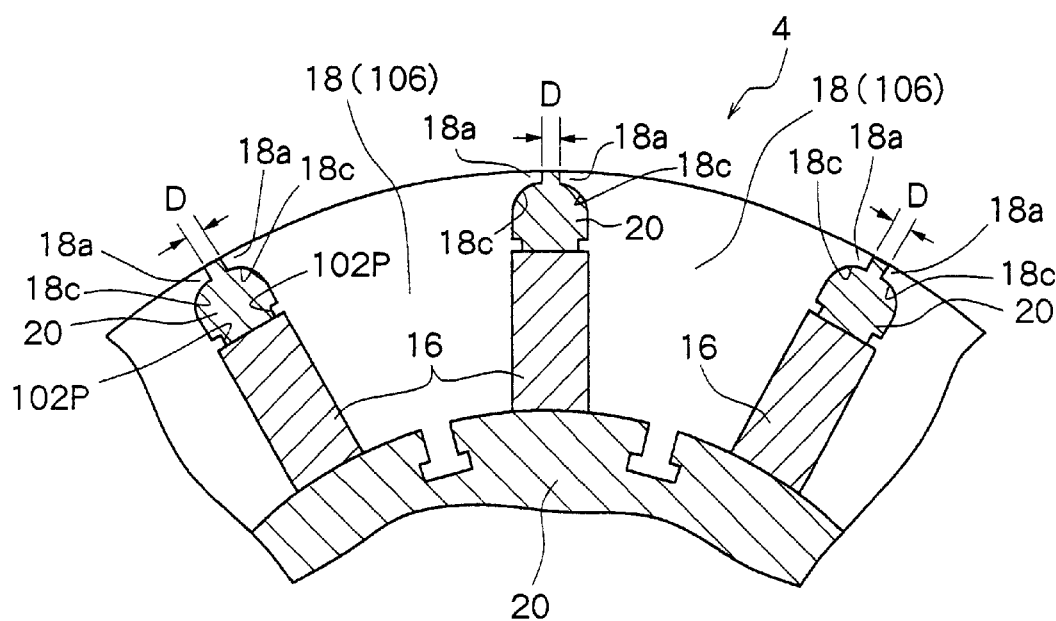
FIG. 19 is a partial sectional view showing, from an axial direction, an essential portion of another modified example of the rotor shown in FIG. 17.

FIG. 18 shows an essential portion of a modified example of the rotor shown in FIG. 17. In the rotor 4 shown in FIG. 17 described earlier, the radially inward surface of each of the overhangs 18a formed on the circumferentially opposite sides of each of the magnetic members 18 is an arcuate surface having an axis center common to the rotor 4. In the rotor 4 shown in FIG. 18, on the other hand, the radially inward surfaces of the overhangs 18a are inclined surfaces 18b linearly inclined from the radially inward ends of the opposed front end surfaces toward a radial inside and toward a corresponding side surface. The other constitutions are substantially the same as in the rotor 4 shown in FIG. 17, and thus their explanations are omitted. FIG. 19 shows an essential portion of another modified example of the rotor 4 shown in FIG. 17. In the rotor 4 shown in FIG. 19, the radially inward surfaces of the overhangs 18a are curved surfaces 18c extending radially inwardly from the radially inward ends of the opposed front end surfaces and extending toward a corresponding side surface. Each of the curved surfaces 18c takes an R-shape when viewed axially of the rotor 4. The position of the axis center of the R-shape is present between the magnetic members 18 when viewed axially. The curved surface 18c is not restricted to the R-shape, but may be other suitable curved surface. Other constitutions are substantially the same as in the rotor 4 shown in FIG. 17, and their explanations are omitted. The basic constitution of the rotors 4 shown in FIGS. 18 and 19 is substantially the same as in the rotor 4 shown in FIG. 17. Thus, substantially the same actions and effects as those of the rotor 4 shown in FIG. 17 are achieved. In the rotors shown in FIGS. 18 and 19, the radially inward surfaces of the overhangs 18a are the inclined surfaces 18b or the curved surfaces 18c. Therefore, the radial width of the overhang 18a gradually increases toward the side surface of the corresponding magnetic member 18 (the base end of the overhang 18a). Thus, the radial strength of the overhang 18a is enhanced, bringing further advantage during high speed rotation of the rotor 4. The constitution of and manufacturing method for the rotors 4 shown in FIGS. 17 to 19 have substantially the same basic characteristics, and can give substantially the same actions and effects.

The rotor of a rotating machine according to the invention has been described in detail above based on the embodiments with reference to the accompanying drawings. However, the invention is not restricted to these embodiments, and various other changes and modifications may be made without departing from the spirit and scope of the invention. For example, the rotating machine 2 in the embodiments is an electric generator, but may be an electric motor having substantially the same constitution as in the rotating machine 2. In this case, substantially the same actions and effects as described above can be obtained without doubt. In the embodiments, the magnetic material 180 (accordingly, each of the magnetic members 18) is composed of a laminate of the silicon steel sheets 100, an embodiment of an electromagnetic steel sheet. However, other embodiments in which the magnetic material 180 is composed of a laminate of other soft magnetic steel plates (steel plates having a relatively weak coercive force in comparison with electromagnetic steel sheets), for example, soft magnetic steel plates such as SPCC, SPHC, and SS41P, are of course feasible. In short, a laminate of steel plates formed from a magnetic material (may be a ferromagnetic material or a soft magnetic material), rather than a nonmagnetic material, is acceptable. There may also be other embodiments in which the magnetic material 180 (accordingly, each of the magnetic members 18) is composed of a block integrally formed beforehand from a magnetic material, rather than a laminate of electromagnetic steel sheets.

In the embodiments, moreover, the body portion 20 into which the sleeve 14, the magnetic material 180 (accordingly, each of the magnetic members 18), and each of the permanent magnets 16 are integrally cast is formed from a nonmagnetic metal material such as an aluminum alloy or a zinc alloy, but may be formed from a nonmetallic material such as high strength synthetic resin having heat resistance. Furthermore, in the embodiments, the sleeve 14 constituting shaft means, the magnetic material 180, and each of the permanent magnets 16 are integrally cast, whereafter the rotating shaft 12 is press fitted into the sleeve 14. However, there may be other embodiments in which the rotating shaft 12 is directly cast integrally together with the magnetic material 180 and each of the permanent magnets 16 without using the sleeve 14. In this case, it is desired to apply sufficient masking to the rotating shaft 12 so that a molten material, such as an aluminum alloy, will not adhere to a portion of the rotating shaft 12 which need not be cast. Besides, in the embodiments, the sleeve 14, the magnetic material 180, and each of the permanent magnets 16 are integrally cast, whereafter the outer peripheral surface of the magnetic material 180 is cut in the aforementioned manner. However, there may be embodiments in which the rotating shaft 12 is press fitted into the sleeve 14, whereafter cutting is performed at the outer peripheral surface of the magnetic material 180. In addition, in the embodiments, the rotating shaft 12 is press fitted into the sleeve 14, whereafter rotation balancing is effected. However, there may be embodiments in which balancing is effected before the rotating shaft 12 is press fitted into the sleeve 14.

I claim:

1. A rotor of a rotating machine, comprising:

a body portion having shaft means mounted therein substantially integrally, having a substantially circular outer peripheral surface and opposite side surfaces, and being formed of a nonmagnetic material; and permanent magnets and magnetic members provided integrally with the body portion, and arranged radially and circumferentially alternately in intimate contact with each other, wherein:

each of the permanent magnets is completely embedded in the body portion;

each of the magnetic members has only a radially outward end surface thereof exposed, and has other surfaces thereof embedded in the body portion; and the body portion is a casting integrating the shaft means, the permanent magnets, the magnetic members and the body portion.

2. A rotor of a rotating machine, comprising:

a body portion having shaft means mounted therein substantially integrally, having a substantially circular outer peripheral surface and opposite side surfaces, and being formed of a nonmagnetic material: and permanent magnets and magnetic members provided integrally with the body portion, and arranged radially and circumferentially alternately in intimate contact with each other, wherein:

each of the permanent magnets is completely embedded in the body portion;

each of the magnetic members has only a radially outward end surface thereof exposed, and has other surfaces thereof embedded in the body portion;

each of the magnetic members has a projection extending radially outwardly of each of the permanent magnets;

a space portion is formed in the circumferential direction by adjacent projections positioned outwardly of a radially outward end surface of each of the permanent magnets;

the body portion is disposed so as to fill the space portions, and a gap among radially inward side surfaces of each of the permanent magnets and each of the magnetic members and an outer peripheral surface of the shaft means, and so as to cover axially opposite side surfaces of each of the permanent magnets and each of the magnetic members to a predetermined thickness; and the exposed radially outward end surface of each of the magnetic members is substantially coplanar with the outer peripheral surface of the body portion.

3. A rotor of a rotating machine, comprising:

a body portion having shaft means mounted therein substantially integrally, having a substantially circular outer peripheral surface and opposite side surfaces, and being formed of a nonmagnetic material; and permanent magnets and magnetic members provided integrally with the body portion, and arranged raidally and circumferentially alternately in intimate contact with each other, wherein:

each of the permanent magnets is completely embedded in the body portion;

each of the magnetic members has only a radialy outward end surface thereof exposed, and has other surfaces thereof embedded in the body portion; and overhangs extending in circumferentially mutually approaching directions from circumferentially opposed side surfaces of adjacent magnetic members and being opposed with a circumferential gap therebetween are formed in radially outward edge portions of the adjacent magnetic members.

4. The rotor of a rotating machine as claimed in claim 3, wherein:

a segment of the body portion is disposed so as to fill the space portion defined by the radially outward end surface of each of the permanent magnets, side surfaces of the adjacent magnetic members circumferentially opposed to each other radially outwardly of the end surface, and opposed surfaces and radially inward side surfaces of circumferentially opposed overhangs; and the exposed radially outward end surfaces of the magnetic members are partitioned at equal intervals by the segments of the body portion disposed so as to fill the circumferential gaps between the opposed overhangs.

* * * * *